United States Patent
Wodeslavsky

Patent Number: 5,425,396
Date of Patent: Jun. 20, 1995

[54] WATER PRESSURE LEVEL CONTROL VALVE

[76] Inventor: Josef Wodeslavsky, #5 Peter Lynas Ct., Tenafly, N.J. 09670

[21] Appl. No.: 85,070

[22] Filed: Jul. 2, 1993

[51] Int. Cl.⁶ .............................................. F16K 31/12
[52] U.S. Cl. ................................ 137/488; 137/492.5; 137/513.5
[58] Field of Search ...................... 137/492.5, 488, 110, 137/513.5, 513.3

[56] References Cited

U.S. PATENT DOCUMENTS

| | | | |
|---|---|---|---|
| 3,111,138 | 11/1963 | Humphreys et al. | 137/513.5 X |
| 3,727,836 | 4/1973 | Visos et al. | 137/492.5 X |
| 4,682,622 | 7/1987 | Weber | 137/492.5 X |
| 5,215,115 | 6/1993 | Dietiker | 137/492.5 |

Primary Examiner—Martin P. Schwadron
Assistant Examiner—Kevin L. Lee

[57] ABSTRACT

A fluid pressure variation valve for use in pressurized fluid systems situated in a pressurized fluid line, for the purpose of reducing the pressure in the fluid line when fluid is not in use, while allowing the normal high fluid pressure of the pressurized fluid system to be maintained when fluid is in use. The valve unit comprises a hollow housing where a valve is moveably situated. A diaphragm is attached to the valve. Two relief valves are disposed in the hollow housing. A first relief valve provides selective communication between the inlet and outlet of the valve housing. In the closed position, the valve defines a first chamber at the inlet of the valve body. A second chamber is defined between the outlet of the valve housing and the second relief valve. A third chamber is defined between the diaphragm and a passage connecting the second relief valve. The third chamber allows selective communication with the outlet via the second relief valve. A fourth chamber, vented, is on the other side of the diaphragm, adjacent to the second chamber, the vented chamber contains a spring. The inlet of the valve housing communicates with the second chamber via a restrictive passage. At the first position, when there is not fluid flow, the diaphragm biases the valve towards the inlet, shutting off communication between the inlet and outlet, thereby causing the pressure at outlet to be lower than at the inlet. At the second position, when there is fluid flow out of the first and second chambers, the spring pushes the diaphragm which drags the valve away from the first position such that the valve opens communication between the inlet and outlet of the valve housing, thereby fluid pressure at the inlet and outlet of the valve body equalizes to the pressure of the pressurized fluid line.

3 Claims, 4 Drawing Sheets

WATER PRESSURE LEVEL CONTROL VALVE

BACKGROUND OF THE INVENTION

1. Field of the Invention

This invention relates to water pressure regulating valve that controls the water pressure following the control of the water meter. It can be used for any water uses in order to maintain the full water pressure that the in coming water line supplies when water is running, and it will reduce the pressure automatically after the water meter to very low pressure when water is not being used, in order to stop water leaks at the valves, faucet, water lines, etc.

2. Description of The Related Art

There are methods that provide varying water pressures. There is demand for such methods, since we need the full blast of the water pressure only when we use the water. High pressure during use is needed to fill the water tank in the toilet, or for the shower, but when water is not in use high pressure in the line is not necessary, and is harmful since all the seals and the valves hoses etc., are under such high pressure, causing them to leak. Leaks are a problem from the point of view of water waste, and also because they are a potential to cause floods when water heaters burst for example.

Water users do not need high pressure water, when they use water they need a stream of water. The water company provides such a stream by pushing the water with water pumps, which consequently create high pressure in the lines. High pressure in the lines is not beneficial to the user, especially when the water use is terminated.

The idea of this invention is to provide water pressure which will be maintained when it is needed and to reduce the water pressure when water is not used, so that water pressure will not harm the system.

SUMMARY OF THE INVENTION

My invention is an apparatus that can distinguish when water is being used and if so, it will provide water in high pressure, and once the use is done, the apparatus will decrease the water pressure to a preset pressure, which will not harm the user in case of a leak, or a crack. The most common problem is the bursting of big quantifies of water from boilers or water heaters. Such devices rust and without notice burst and flood the place. The apparatus is installed after the water meter and it consists of a pressure regulator that will reduce the water pressure when water is not running through it. At the moment when water will be used, such regulator will sense it and it will allow the water stream to pass through it straight to the user. When the user will shut off the water, the apparatus will sense it and will start to reduce the water pressure in the system. If water will leak, it will help reduce the pressure in the system, and it is an outcome of the structure of the apparatus.

DESCRIPTION OF THE PREFERRED EMBODIMENT

Figure 1:
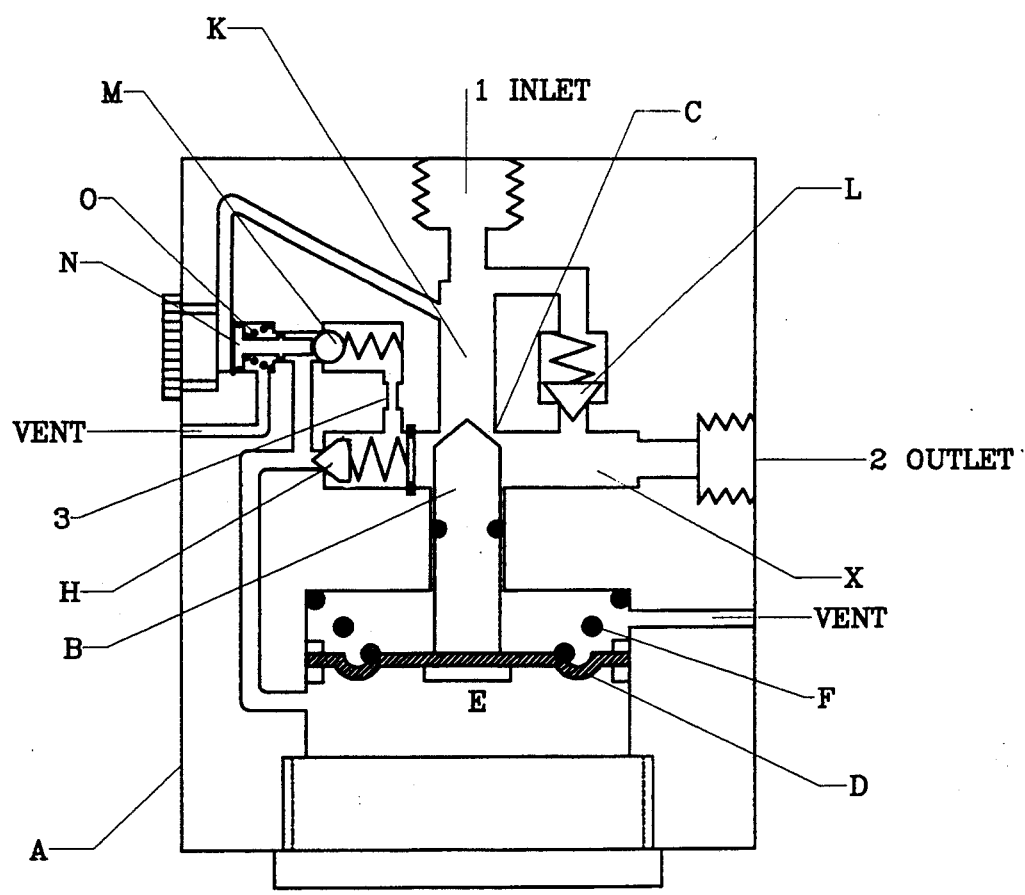
FIG. 1 illustrates the apparatus.

FIG. 1 will illustrate the apparatus which consists of a housing A which has a water inlet 1 and water outlet 2. A valve B controls the water passage from inlet 1 to outlet 2 by opening and closing a bore, which terminates in seat C. A first chamber, K, is defined between inlet 1 and seat C. Valve B is controlled by membrane D which is exposed to water pressure from a second chamber, E: chamber E is defined between membrane D and valve H, where valve H controls the fluid flow between chamber E and outlet 2. A chamber X is defined between valve H and outlet 2. A tiny passage 3 is formed between one-way valves M and H, where one-way valve M controls the fluid flow in passage 3 from chamber X to chamber E. Contraction spring F, in its expanded state, holds membrane D such that valve B is kept away from seat C. One way valve M is controlled by a piston N which is exposed to water pressure from inlet 1. A spring O suspended between piston N and valve M keeps piston N away from valve M when there is not sufficient fluid pressure acting on piston N. One way valve M is held closed by its own spring, keeping the tiny passage 3 closed, preventing the fluid from flowing from chamber X to chamber E via passage 3. When one-way valve M closes passage 3, it prevents fluid from flowing from inlet 1 to chamber E. In sum, one-way valve M is urged by its own spring to keep tiny passage 3 closed. When sufficient fluid pressure is acting on piston N to overcome both the force of spring O and the force of valve M's spring, piston N will push valve M to open position, opening passage 3, allowing fluid flow from chamber K to chamber E. Also, housing A consists of a relief valve L, connected between inlet 1 and outlet 2.

Membrane D has a much larger area exposed to water from chamber E than the area of the end portion of valve B facing the direction of water inlet 1. Valve B's end which is in the direction of inlet 1 has an area which is larger than the diameter of seat C, i.e., seat C's diameter is 0.5 of valve B's diameter. Because valve B is cone shaped, it will allow the valve to simultaneously prevent fluid flow from inlet 1 to outlet 2, and yet allow fluid flow from chamber E to outlet 2. Therefore, when valve B is in closed position siting on seat C blocking the flow from inlet 1 to outlet 2, valve B still permits fluid flow between chamber E and outlet 2 via the passage between outlet 2 and one-way valve H -namely chamber X. Valve H's end has a larger area on its first end portion facing outlet 2 than to its other end portion.

When the apparatus is installed valve B is held open by spring F, and valve H, M and L are held closed by their springs. When water is used, it will flow freely to the user from inlet 1 through outlet 2. The moment the user closes the faucet, the pressure at outlet 2 will start to increase, and water from inlet 1 will start to accumulate and build up pressure in on piston N and in passage 3. As the fluid pressure builds up it will be blocked by one way valve M. When sufficient water pressure has accumulated on piston N, spring O will compress and thus valve M will move and open communication between inlet 1 and passage 3. Water from inlet 1 will flow through passage 3 into chamber E. Membrane D will travel and push valve B towards seat C due to the building water pressure in chamber E until valve B will sit tightly against seat C. Because the exposed area of the end of valve B which is in the direction of water inlet 1 is smaller than the area of membrane D which is exposed to water from chamber E, a small water pressure on membrane D will be able to move valve B against a much higher water pressure from inlet 1 forcing valve B to sit in seat C. Once valve B is closed the area of valve B's end in the direction of water inlet 1 is larger than seat C's area. As a result, valve B will be tightly fitted in seat C because of the reduced pressure acting on valve B's end from water inlet 1. This reduced pressure from water inlet 1 will allow membrane D to apply even a smaller pressure than it initially applied on valve B when it first pushed it into seat C. Later it will be shown that a small leak will be stopped due to the difference in pressure required to lock valve B into seat C, versus the pressure required to keep valve B locked in seat C. Thus the ratio of exposed areas will be calculated to allow this process to occur. Under working condition high pressure could build up at the outlet, in this situation relief valve L will release the excess water to inlet 1.

When the user opens the water valve, pressure at outlet 2 will quickly drop and water on the side of valve H facing outlet 2, namely chamber X, will rush out of outlet 2. As the water pressure in chamber E and outlet 2 seek to be in equal pressure, water from chamber E will empty to outlet 2 via one way valve H. Consequently, as a result of the decreasing water pressure in chamber E, decreasing water pressure acts on membrane D which eventually will result in the movement of valve B away from seat C. This small movement of valve B away from seat C will expose the total area of valve B to water pressure from inlet 1, increasing the force acting on valve B by water from inlet 1, resulting in the quick withdraw of valve B and the emptying of chamber E to outlet 2. This will occur because the diameter of seat C is smaller than the exposed area of valve B's end, therefore it takes a higher water pressure to remove valve B from seat C than to continue to push valve B down. Since the end portion of valve H facing outlet 2 has a larger area than its other end portion, a lower water pressure will be maintained on the side of valve H facing outlet 2—namely chamer X, while a higher pressure will exists in chamber E. The difference in surface area is used in order to eliminate the fluctuation of valve H when similar pressures exists on both ends of the valve.

The following will be a description of problematic instance this system will be able to avoid: if a drip or leak exists in the water system, which will stop if a lower pressure will act on outlet 2, this invention will stop such a leak. If a weak drip or a leak exists in outlet 2, water at the end portion of valve H facing out let 2, namely chamer X, will empty out slowly. Consequently, water from chamber E will empty out to outlet 2 through one way valve H. As the water drips, the pressure in the system decreases slowly. Thus, if the drip will stop when the water pressure is reduced to the minimal pressure necessary for membrane D to push valve B onto seat C, then the drip will stop. This is a result of the flexibility of the system. For example, it will be necessary for 2 Atmospheres to act on membrane D in order to push valve B to seal seat C tightly. Once valve B is seated tightly against seat C, the opposing pressure on valve B from water inlet 1 is greatly reduced due to the decreased exposed area of valve B upon which water is applied, since the diameter of seat C is smaller than the end of valve B. Thus, any pressure by membrane D on valve B greater than 1.5 Atmosphere will be sufficient to keep valve B fitted tightly in seat C. Therefore, in case of a weak drip, if the drip will stop when a pressure no greater that say 1.6 Atmospheres is applied to the outlet 2, the drip will stop. This is possible because it is possible for the system to function with the decreased pressure in chamber E, since 1.5 Atmospheres will be sufficient to keep valve B seated on seat C. The second problematic case is one in which for some reason, the water pressure inside the system exceeds the water pressure at the inlet. Under such a case water from the system will empty out from the system via one way valve L to water inlet 1.

Figure 2:
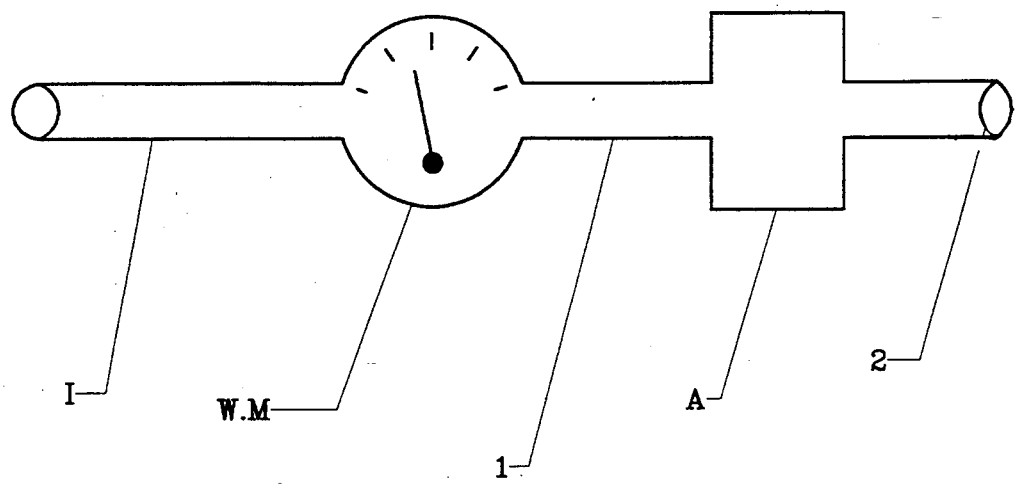
FIG. 2 illustrates the apparatus installed in the water system.

FIG. 2 will illustrate the water inlet line 1, water meter WM, pressure regulator A, and water supply line to the user 2.

Figure 3:
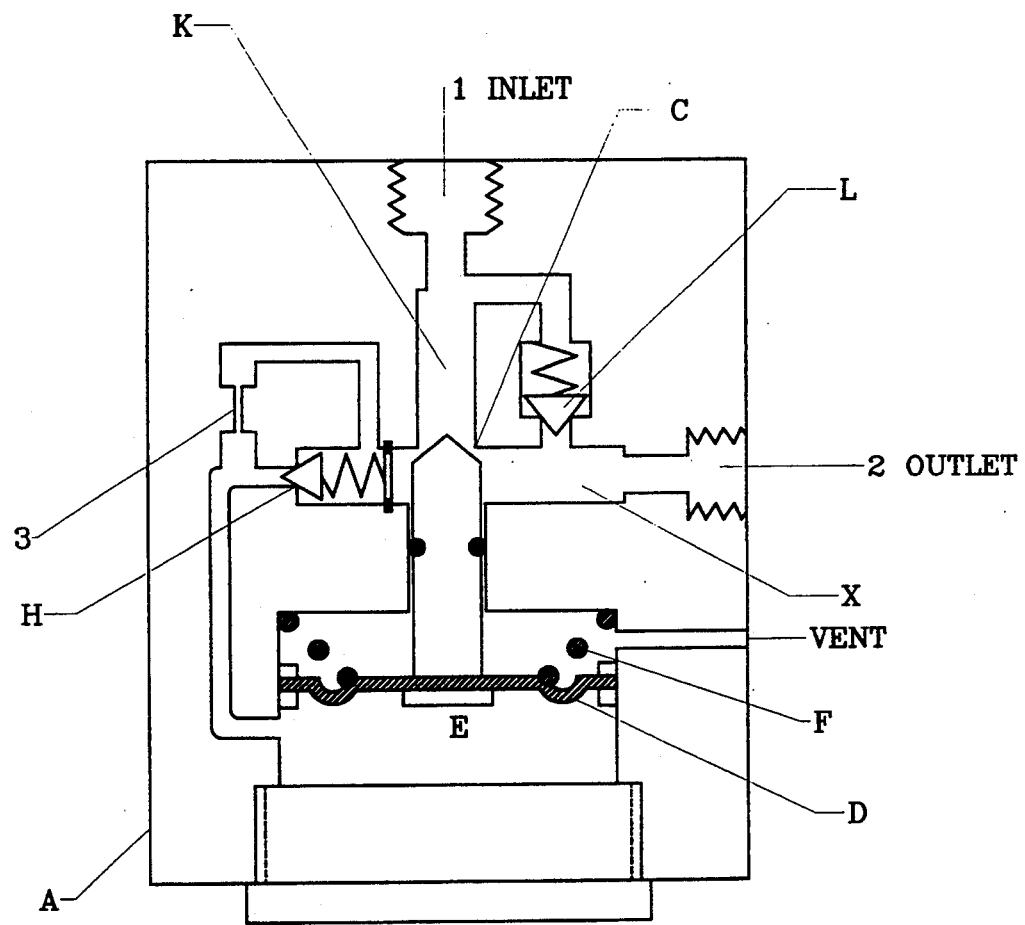
FIG. 3 illustrates another configuration of the system.

Another configuration can be provided for example as in FIG. 3. FIG. 3 illustrates a similar schematic as FIG. 1 except that valve M is not present and there is only the tiny passage 3 from the first end portion of valve H to the second end portion of valve H. Since the passage is small, when water is used, the accumulation of water in chamber E is very slow. Water will enter chamber F via the tiny passage, after a long while chamber E will fill sufficiently to cause membrane D to push valve B to sit on seat C. This will stop the flow of water from inlet 1 to outlet 2. The size of the tiny passage is such that when all the valves and faucets are closed, it will take for example at least 15 minutes before the pressure in the system will drop. This will ensure that if a faucet or valve is open, it will take longer than 15 minutes before valve B will sit on seat C. Thus ensuring that water usage will not be interrupted by the sudden drop of water pressure. The use of the tiny passage is another way to control the movement of membrane B.

Figure 4:
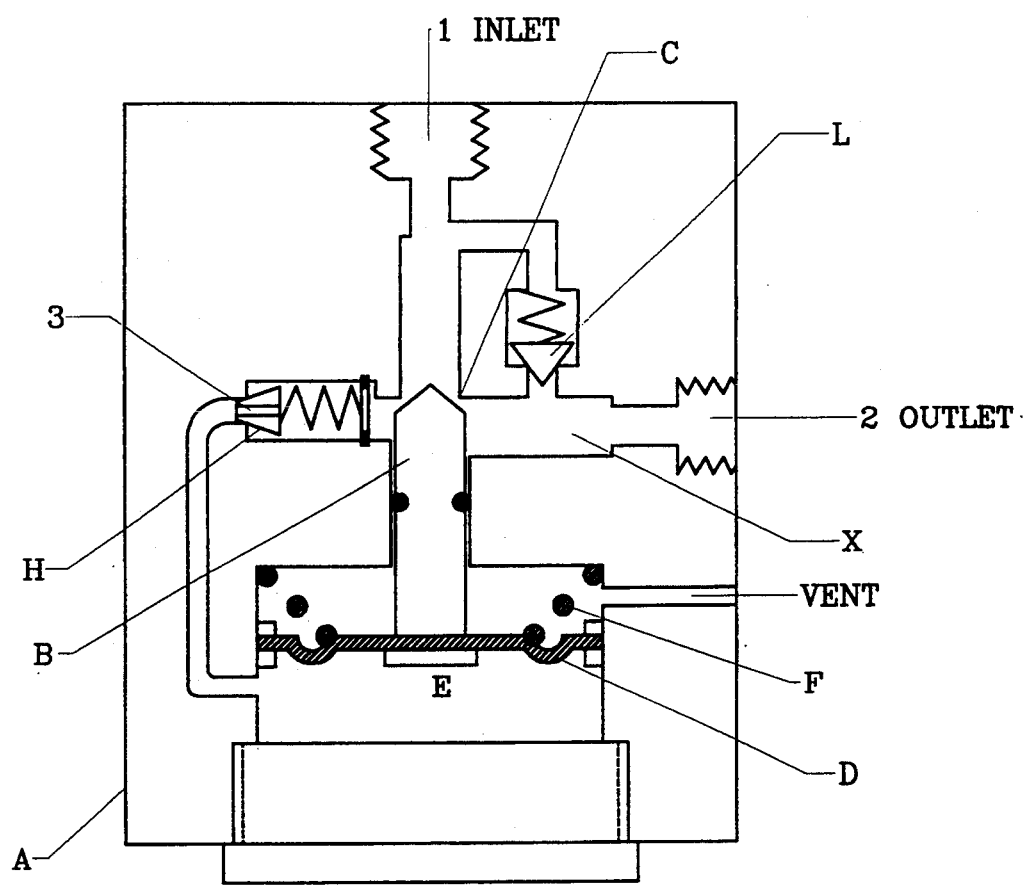
FIG. 4 illustrates the device with another configuration for the restrictive passage.

Also, another configuration is shown in FIG. 4, showing the device where second valve H has a groove which serves as a restrictive passage 3. One way valve H in this configuration permits a water leak from chamber X to pass to chamber E. Also, another embodiment could have the tiny passage connect between inlet 1 and chamber E.

I claim:

1. A fluid pressure variation valve device for use in pressurized fluid systems controlled by faucets/cocks, situated in a pressurized fluid line, for the purpose of reducing the pressure in the fluid line and at the faucets/cocks when fluid is not in use, while allowing the normal high fluid pressure of the pressurized fluid system to be maintained when fluid is in use, said valve device comprising:

a hollow valve housing adapted to be disposed within said pressurized fluid supply and having a first end portion adapted to be connected to said pressurized supply, and a second end portion, said valve housing including a conduit between said first and second end portions to provide communication between said end portions, said conduit having a valve seat, said valve housing further comprising a first relief valve disposed between said first and second end portions to allow selective communication between said end portions;

a diaphragm sealingly disposed across said valve housing;

a second relief valve disposed within said housing;

a valve moveably situated in said valve housing, said valve having a first end portion and a second end portion.

in a first position, said first end portion of said valve is engageable with said seat to divide said conduit into an inlet portion and an outlet portion, defining a first chamber between said seat and said first end portion of said housing;

a second chamber between said diaphragm and a passage connecting said second relief valve;

a third chamber between said second relief valve and said second end portion of said housing, where the second relief valve provides selective communication from said second chamber to said third chamber;

a valve having a cross section such that in a first position said valve can close communication between said end portions of said valve housing while providing communication between said second end portion of said housing and said second chamber via said third chamber, and in a second position, said valve disengages from said seat such that said valve can open communication between said first and second end portions of said valve housing, said second end portion of said valve is sealingly connected to said diaphragm, a fourth chamber adjacent to said second chamber is defined on the other side of said diaphragm, said fourth chamber comprises a spring biasing said diaphragm to said second position, furthermore, said fourth chamber is vented;

a restrictive passage disposed in said valve housing to provide communication between said first end portion of said valve housing and said second chamber;

whereby, after the faucets/cocks are shut off and fluid is not flowing out of said second end portion of said housing, fluid flows from said first end portion accumulating in said second chamber via said restrictive passage, after a pre-set time, the accumulating fluid will bias and maintain said diaphragm in said first position against the force of said springs, thereby disconnecting communication between said first and second end portions of said valve housing, thereby maintaining a lower pressure at said second end portion than at said first end portion of said valve housing, after the faucets/cocks are opened, the pressure is released from the second chamber and the fluid begins to empty out of the second chamber through the second relief valve and past said valve to the second end portion of the housing resulting in said spring pushing said diaphragm and said valve towards the second position thereby fully opening said valve and causing the fluid from the second chamber to be forced out through the second relief valve and out of the second end portion of said housing.

2. A valve device according to claim 1, wherein said restrictive passage is built into said second relief valve such that when the relief valve is in the closed position, the relief valve is only partially sealed, allowing a leak when the relief valve is in the closed position.

3. A valve device according to claim 1, wherein said valve housing further comprises means that control the flow between said first and second end portions of said housing and said second chamber by closing and opening the restrictive passage.

* * * * *